(12) United States Patent
Marupaduga

(10) Patent No.: US 11,445,452 B1
(45) Date of Patent: Sep. 13, 2022

(54) SYSTEMS AND METHODS FOR LIMITING DEVICE TRANSMIT POWER

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 34 days.

(21) Appl. No.: 17/115,267

(22) Filed: Dec. 8, 2020

(51) Int. Cl.
*H04W 52/36* (2009.01)
*H04W 52/24* (2009.01)
*H04W 8/24* (2009.01)

(52) U.S. Cl.
CPC ......... *H04W 52/367* (2013.01); *H04W 8/245* (2013.01); *H04W 52/241* (2013.01)

(58) Field of Classification Search
CPC ............. H04W 52/241; H04W 52/243; H04W 52/244; H04W 52/146; H04W 52/367; H04W 52/10; H04W 36/165; H04W 52/283; H04W 72/082; H04W 72/1231; H04W 8/245
See application file for complete search history.

(56) References Cited

U.S. PATENT DOCUMENTS

| 2007/0213011 A1* | 9/2007 | Kim ...................... H04W 52/04 455/63.1 |
| 2018/0242331 A1* | 8/2018 | Zhu ........................ H04J 11/005 |
| 2020/0383059 A1* | 12/2020 | Vivanco .............. H04W 52/241 |
| 2021/0076286 A1* | 3/2021 | Úbeda ................ H04B 7/18541 |

* cited by examiner

*Primary Examiner* — Quoc N Vuz

(57) ABSTRACT

Methods and systems are provided for limiting transmit power for one or more devices associated with a wireless telecommunications network. The methods can include determining if a noise level is at or above a threshold value. The methods can also include requiring one or more devices to limit transmit power on communications to the base station.

18 Claims, 6 Drawing Sheets

SYSTEMS AND METHODS FOR LIMITING DEVICE TRANSMIT POWER

SUMMARY

The present disclosure is directed, in part, to systems and methods for limiting device transmit power, substantially as shown in and/or described in connection with at least one of the figures, and as set forth more completely in the claims.

In aspects set forth herein, and at a high level, a noise level on a receive side of the radio or base station is analyzed to determine if it is at or above a threshold value. In aspects, when the noise level is at or above such a threshold value the base station may cap or limit the transmit power of one or more devices communicating with the base station.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
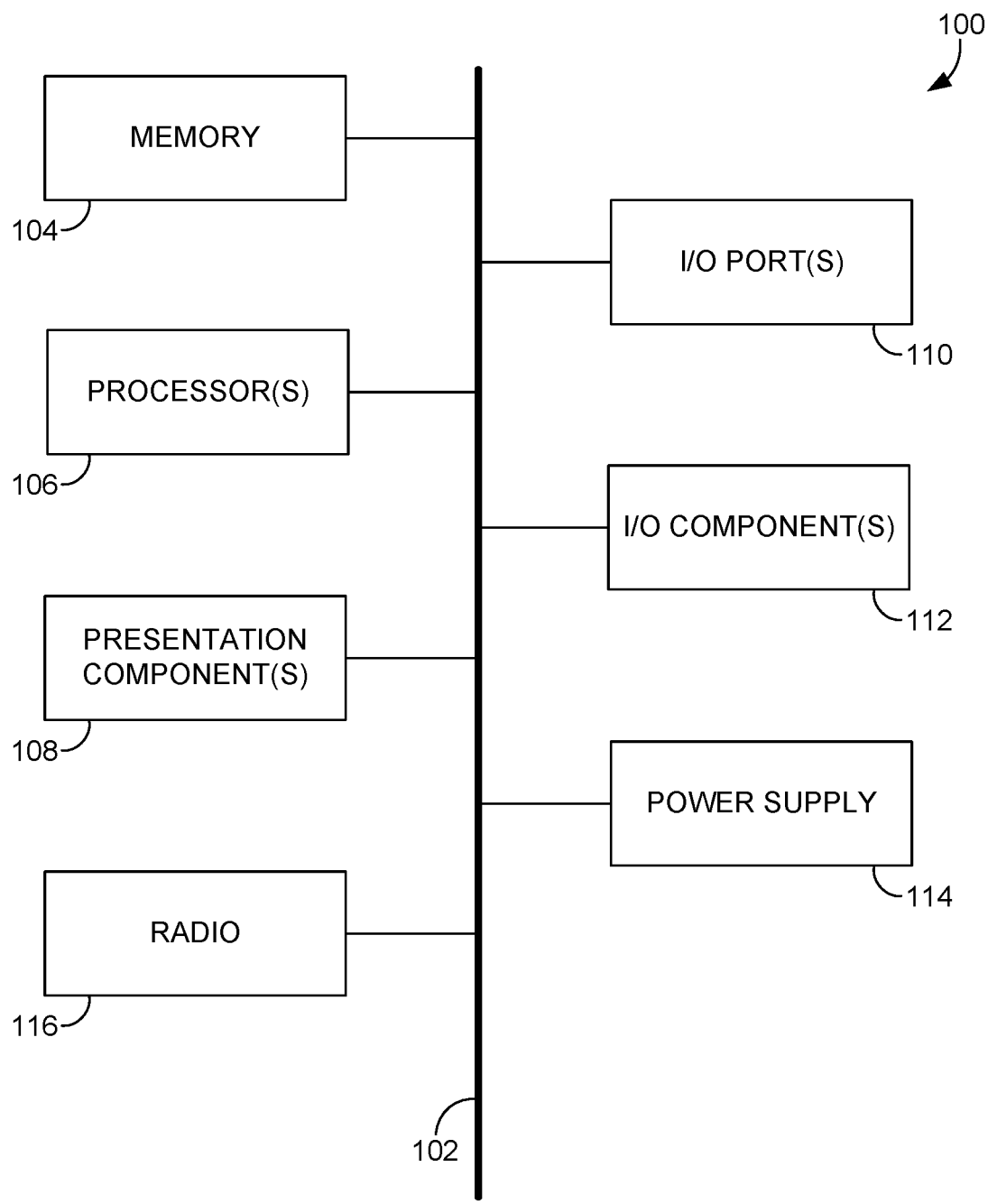
FIG. 1 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| gNodeB | Next Generation Node B |
| GIS | Geographic/Geographical/Geospatial Information System |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| NR | New Radio |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RS SI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 31$^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD- ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, in certain conventional systems, when a sector is highly loaded with devices, high noise levels may be present on the uplink or receive side of the radio or base station. In such systems, the high noise levels may impact the radio capability to decode signals and adversely affect the performance of the sector. In the same or other conventional systems, high noise levels can occur in sectors that have a high number of devices transmitting at high power or higher power than other devices in the sector. In certain scenarios, it may be desirable to limit device transmit power in order to reduce high noise levels on the receive side of the radio and/or base station.

The systems and methods provided herein can alleviate one or more of the problems discussed above. For instance, in aspects, the systems disclosed herein can determine if a noise level at a base station is at or above a threshold value and, when such a threshold is reached, devices communicating with the network can be required to lower and/or limit transmit power on the uplink and/or communications to the base station. In the same or alternative aspects, the systems described herein may continue to determine if the noise level at the base station is at, above, or below a threshold value, and when the noise level is at or below the threshold, the requirement for devices to limit transmit power may be withdrawn. In certain aspects, as described herein, it may be desirable to limit transmit power of specific devices to varying levels based on the carrier aggregation capability of the device and/or based on the location of the device within the sector.

Accordingly, in one aspect, a system for dynamically limiting transmit power for one or more devices associated with a wireless telecommunications network is provided. The system can include an antenna array including one or more antenna elements; and one or more processors. In aspects, the one or more processors can be configured to execute operations that include receiving, at a base station associated with the antenna array, one or more first communications from one or more devices; and determining, during a first time period, if a noise level at the base station is at or above a threshold value. In certain aspects, the operations can further include, based at least partly on the determining, requiring at least a portion of the one or more devices to limit transmit power on one or more second communications to the base station to a specified level or below.

In another aspect, a method for dynamically limiting transmit power for one or more devices associated with a wireless telecommunications network is provided. In an aspect, the method can include determining, during a first time period, if a noise level at a base station associated with an antenna array having one or more antenna elements is at or above a threshold value. In aspects, the method can also include, based at least partly on the determining, requiring one or more devices to limit transmit power on communications to the base station to a specified level that is below a maximum transmit power capability of the respective one or more devices.

In yet another aspect, a method for dynamically limiting transmit power for one or more devices associated with a wireless telecommunications network is provided. In aspects, the method can include receiving, at a base station associated with an antenna array comprising one or more antenna elements, one or more first communications from one or more devices; and determining, during a first time period, if a noise level at the base station is at or above a threshold value. The method can also include, based at least partly on the determining, requiring at least a portion of the one or more devices to limit transmit power on one or more second communications to the base station to a specified level or below, in an aspect.

As used herein, user equipment (UE) (also referenced herein as a user device or device) can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, a power supply 114, and a radio 116. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, 5G, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
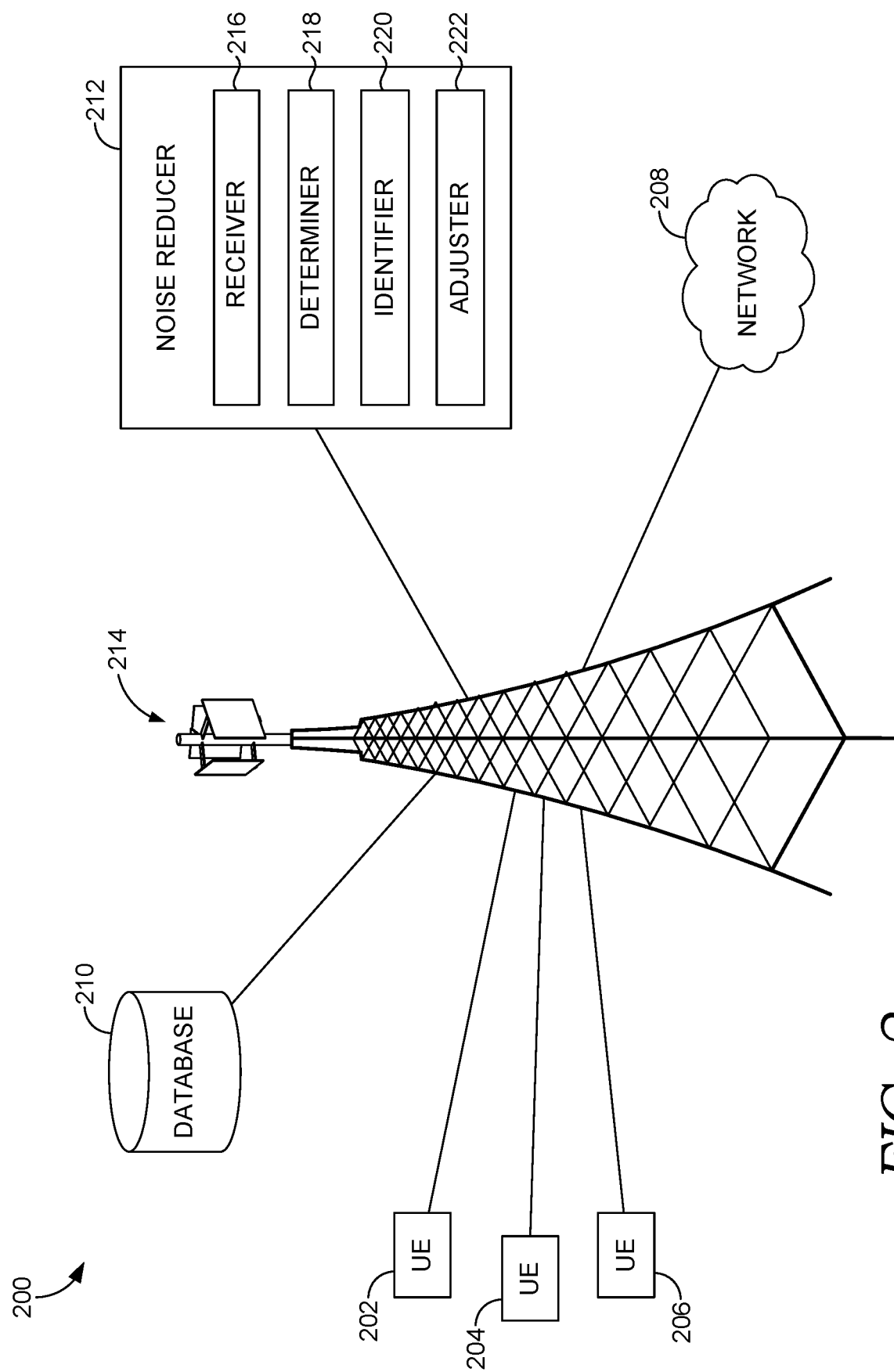
FIG. 2 illustrates a diagram of a network environment in which implementations of the present disclosure may be employed, in accordance with aspects herein.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment 200 be interpreted as having any dependency or requirement relating to any one or combination of components illustrated.

The network environment 200 of FIG. 2 includes user devices 202, 204, and 206, a cell site 214, a network 208, a database 210, and a noise reducer 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, an IoT device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, in aspects, a user device can include, for example, a display(s), a power source(s) (e.g., a battery), a data store(s), a speaker(s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like. In an aspect, the cell site 214 of the present disclosure may communicate with at least one user device, such as the user device 202 via a wireless communication protocol, such as a 4G wireless communication protocol, a 5G wireless communication protocol, or both.

As shown, in aspects, the cell site 214 is in communication with the noise reducer 212, which comprises various components that are utilized, in various implementations, to perform one or more methods for limiting device transmit power for one or more devices, which may in aspects, reduce noise at a base station and/or on the receive side of a radio associated with the cell site 214. In certain aspects, a base station associated with the cell site 214 can include one or more processors for executing all or a part of the actions for dynamically limiting device transmit power, e.g., all or part of the actions performed by the noise reducer 212. In aspects, the noise reducer 212 includes a receiver 216, a determiner 218, an identifier 220, and an adjuster 222. However, in other implementations, more or less components than those shown in FIG. 2 may be utilized to carry out aspects of the systems and methods described herein. Each of the components or sub components of the noise reducer 212 may be a stand-alone or combined processor, server, or other computer processing component that is suitably configured to perform the operations described herein.

In various aspects, the receiver 216 of the noise reducer 212 is generally responsible for receiving communications from one or more devices, e.g., the user devices 202, 204, and/or 206. In aspects, the communications from one or more devices can include any information that is transmitted from one or more devices and received at the cell site 214, and/or an associated base station or radio.

In certain aspects, the receiver 216 may receive information from one or more components associated with the cell site 214, e.g., a radio, an antenna, a base station, etc., that is relevant to aid and/or facilitate one or more actions of the noise reducer 212. In one aspect, the receiver 216 can receive information associated with a noise level on the receive side of the cell site 214 or associated components, e.g., a base station. For instance, the receiver 216 can receive information associated with a noise level at the cell site 214, which in aspects, may be associated with communications from one or more devices to the cell site 214.

In aspects, the receiver 216 may receive information from the database 210. In aspects, the database 210 can include any information that is relevant to aid and/or facilitate one or more actions of the noise reducer 212. In one aspect, the database 210 can include noise level threshold values, e.g., noise level threshold values for the receive side of the cell site 214 and/or associated components. In one aspect, the noise level threshold value can be any value that is determined or pre-determined by any component of the network environment 200, including a service provider or cell site operator. In certain aspects, the noise level threshold value can be in a range of −70 to −100 decibels with reference to one milliwatt (dBm), or in a range of −80 to −90 dBm, or about 85 dBm. In the same or alternative aspects, the noise level threshold value can be greater than about −110 dBm. As understood by one of skill in the art, when referring to a noise level in decibels with reference to one milliwatt (dBm), the closer the noise value is to zero (0), the greater the noise. For instance, a noise level value of −85 dBm is greater in noise than a noise level value of −110 dBm.

In certain aspects, the receiver 216 may receive from the database 210 information associated with one or more devices and/or user devices 202, 204, and/or 206. In aspects, a non-limiting list of information associated with one or more devices and/or user devices 202, 204, and/or 206 includes: maximum and/or minimum transmit power capabilities; carrier aggregation capabilities; prior transmit power utilized; information on prior utilized carrier aggregations; or a combination thereof. In the same or alternative aspects, such information associated with one or more devices and/or user devices 202, 204, and/or 206, can be communicated from the devices, e.g., in a power headroom report, and received by the receiver 216.

In aspects, the determiner 218 can determine if a noise level is at or above a threshold value. For instance, in certain aspects, the determiner 218 can determine whether a noise level on the receive side of the cell site 214, e.g., at an associated base station, associated antenna, and/or associated radio, is at or above a threshold value. In aspects, the threshold value can be received by the receiver 216. In various aspects, the noise level on the receive side of the cell site, e.g., the cell site 214, can be associated with, or at least partly due to, one or more communications from one or more devices, e.g., the user devices 202, 204, and/or 206. For instance, in certain aspects, a cell site, e.g., the cell site 214, or associated sector, can be highly loaded with devices that are transmitting at high power and can at least partly result in high noise rise at the cell site 214.

In certain aspects, the determiner 218 can determine whether a noise level on the receive side of the cell site 214, e.g., at an associated base station, associated antenna, and/or associated radio, is at or above a threshold value at any time or during any time period. In aspects, the determiner 218 can continually monitor the noise level and/or analyze the noise level at specified time intervals. In certain aspects, the determiner 218 can determine whether a noise level on the receive side of the cell site 214, e.g., at an associated base station, associated antenna, and/or associated radio, is at or above a threshold value during at least a first time period, and then determine if the noise level is at, above, or below a threshold level during a second time period, subsequent to the first time period. In the same or alternative aspects, the determiner 218 can monitor the noise level upon the noise reducer 212 receiving a request from a network operator or the network to monitor the noise level and/or determine if the noise level is at, above, or below a threshold value.

In certain aspects, the determiner 218 can determine if loading on the sector or cell site 214 has changed. For instance, in one aspect, the determiner 218 can determine if the number of active devices, e.g., the user devices 202, 204, and/or 206, has changed from one time point or time period to a subsequent time point or time period. In certain aspects, the determiner 218 may determine if a noise level at the cell site 214 and/or for one of the associated components, is at or above a threshold value, and also may determine if the loading in the sector or cell site 214 has changed. In such aspects, the determiner 218 may first determine if a noise level at the cell site 214 and/or for one of the associated components is at or above a threshold value, and thereafter, may determine if the loading in the sector or cell site 214 has changed. In an alternate aspect, the determiner 218 may first determine if the loading in the sector or cell site 214 has changed over a time period or is considered high, and thereafter may determine if a noise level at the cell site 214 and/or for one of the associated components is above a threshold value.

In aspects, the identifier 220 can identify any information that is relevant to aid and/or facilitate one or more actions of the noise reducer 212. In certain aspects, the identifier 220 can identify or provide information that is associated with the cell site 214 or associated components, and/or information that is associated with one or more devices, e.g., the user devices 202, 204, and/or 206. For instance, as discussed below, the identifier 220 can identify or provide location information associated with one or more devices communicating with the cell site 214. In certain aspects, the identifier 220 can identify specific information received by the receiver 216.

In certain aspects, the identifier 220 can identify or provide carrier aggregation information associated with one or more devices in the sector and/or cell site 214. For example, in one aspect, the identifier 220 can identify the carrier aggregation capabilities of one or more devices in communication with the cell site 214. In the same or alternative aspects, the identifier 220 can identify information associated with carrier aggregation for a device communication with the cell site 214 for a prior communication, a current communication, or an intended communication. In one aspect, the identifier 220 can identify if a prior, current, or intended communication aggregated/would aggregate two, three, four, or more component carriers in order to increase bandwidth and bitrate of the communication.

In aspects, the adjuster 222 can adjust, modify, and/or require one or more of the devices to limit transmit power on communications with the cell site 214 or associated components. For instance, in one aspect, the adjuster 222 can require one or more devices to limit and/or reduce transmit power compared to the transmit power utilized in prior communications with the cell site 214. In various aspects, the adjuster 222 can require one or more devices to reduce transmit power by at least 2 dBm compared to the transmit power utilized in prior communications with the cell site 214 and/or compared to the maximum transmit power of a device.

In certain aspects, the adjuster 222 can require one or more devices to limit transmit power on communications to the cell site 214 or associated components to a level that is below the maximum transmit power that the device is capable of. In one example aspect, the adjuster 222 can require a high power device, e.g., a device capable of a transmit power of 26 dBm or more, to limit transmit power to about 24 dBm or less. In another example aspect, the adjuster 222 can require a low power device, e.g., a device capable of a transmit power of 23 dBm or more, to limit transmit power to about 21 dBm or less.

In certain aspects, the adjuster 222 can require various devices within the sector and/or cell site 214 to transmit power at varied levels depending upon information associated with the device. For instance, as discussed above, the adjuster 222 can require a high power device to limit transmit power to a specified value that is different than the required limit of a low power device. In various aspects, the adjuster 222 can selectively require device transmit power limits based on carrier aggregation capabilities of a device and/or past or current carrier aggregation usage. For instance, in an aspect where a first device aggregates three component carriers for one or more communications with the cell site 214 and a second device aggregates four component carriers for one or more communications, the adjuster 222 may require a higher transmit power limit for the second device comparted to the first device, as the second device is communicating more information than the first device. In various aspects, as discussed below, the adjuster 222 may require varied device transmit power limits depending upon the location of the device, e.g., cell-near versus cell-edge devices.

In certain aspects, the adjuster 222 can withdraw one or more device transmit power limits. For instance, in various aspects, where the determiner 218 determines that the noise level is at or below a threshold value and/or if the sector has a reduced device or communication load, the adjuster 222 can withdraw device transmit power limits for one or more devices.

In aspects, the adjuster 222 and/or the noise reducer 212 can communicate the device transmit power limits and/or withdrawal of such limits to the respective devices in any convenient manner. For instance, in various aspects, the adjuster 222 and/or the noise reducer 212 can indicate device transmit power limits in any of the broadcast messages to the UEs that are just connecting to the sector, and for the UEs that are already connected to the sector, this information could be sent on any of the downlink control channels.

Figure 3:
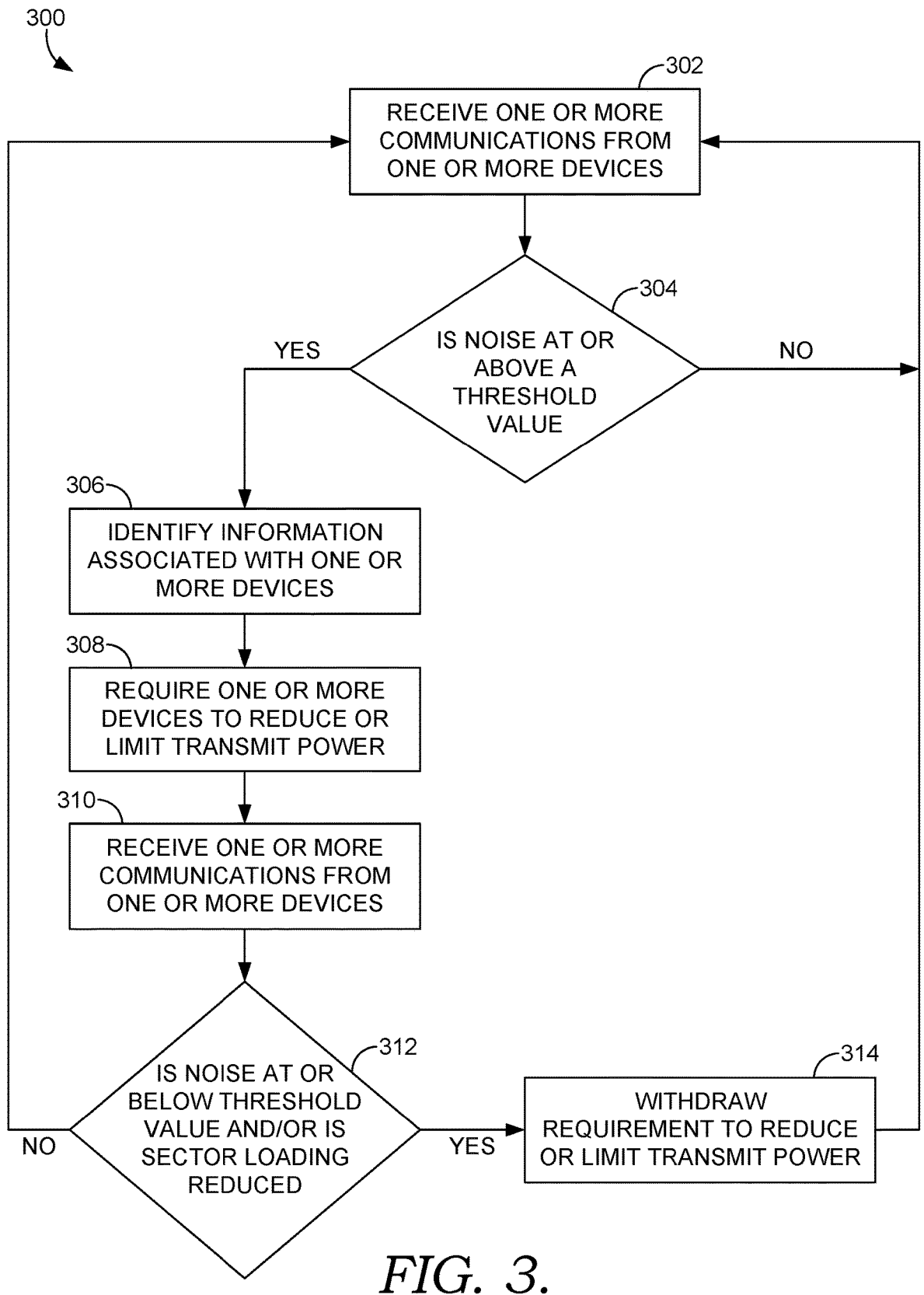
FIG. 3 depicts a flow diagram of an exemplary method for dynamically limiting device transmit power, in accordance with aspects herein.

FIG. 3 depicts a flow diagram of an example method 300 for limiting transmit power from one or more devices associated with a wireless telecommunications network. In the aspect depicted in FIG. 3, the method 300 can begin at step 302, where one or more communications may be received from one or more devices. In aspects, the one or more communications can be sent from one or more devices and can be received at a base station, e.g., a base station associated with the network environment 200 of FIG. 2 discussed above. In aspects, the receiver 216 of the noise reducer 212 of FIG. 2 can perform the step 302.

The step 304 of the method 300 includes determining if a noise level is at or above a threshold value. In aspects, it should be understood that the step 302 can be optional and that the method 300 may also begin at the step 304 of determining if a noise level is at or above a threshold value. In aspects, the determiner 218 of the noise reducer 212 of FIG. 2 can perform at least a portion of the step 304. In certain aspects, as discussed above with reference to the noise reducer 212 of FIG. 2, a determination is made as to whether a noise level on a receive side of cell site and/or a base station is at or above a threshold value, such as one of the threshold values discussed above with reference to the noise reducer 212 of FIG. 2. In aspects, a noise level above a threshold value refers to a level of noise that is greater than the level of noise associated with the threshold value. In the same or alternative aspects, a noise level below a threshold value refers to a level of noise that is less than the level of noise associated with the threshold value. In certain aspects, as also discussed above, the determining of the step 304 can include determining whether a noise level is at or above a threshold over a specified period of time or at predetermined time periods or points of time. In the step 304 of the method 300, when it is determined that the noise level is below or at the threshold level, the method 300 can return to the step 302 and/or stay at the step 304 and continue to monitor the noise level.

In aspects, when in the step 304 it is determined that the noise level is at or above the threshold, the method 300 can proceed to the optional step 306. In aspects, the step 306 can include identifying information associated with one or more devices. In aspects, the identifier 220 of the noise reducer 212 can perform the step 306. In certain aspects as discussed above, in the step 306, the information identified can include carrier aggregation capabilities of one or more devices and/or information associated with carrier aggregation for a prior communication, a current communication, or an intended communication. In the same or alternative aspects, the step 304 can include identifying location information associated with the one or more devices. In aspects, where the step 306 is optional, the method can proceed from the step 304 to the step 308. In alternate aspects, the step 306 may be performed prior to the step 308.

In the step 308, one or more devices can be required to limit transmit power on the uplink and/or on communications from the one or more devices to the base station. In aspects, the step 308 can be performed by the adjuster 222 of the noise reducer 212 of FIG. 2. In aspects, as discussed above, the transmit power of the one or more devices can be limited and/or reduced for communications with the base station. For instance, in one aspect, the one or more devices can be required to reduce transmit power compared to the transmit power utilized in prior communications and/or be required to limit transmit power on communications to a level that is below the maximum transmit power that the device is capable of. In certain aspects, as discussed above, the one or more devices can be required to reduce transmit power to a varied and/or specific level based on carrier aggregation information associated with the one or more devices and/or based on location information of the one or more devices.

In aspects, the method 300 can continue to the step 310 where one or more second communications are received from one or more devices. In aspects, the one or more second communications can be communicated using a device transmit power specified (or within or below the limit required) from the step 308. In aspects, the receiver 216 of the noise reducer 212 of FIG. 2 can perform the step 310. In certain aspects, the step 310 can also or alternately include receiving information from one or more devices, such as carrier aggregation information, location information, or other information discussed above. In certain aspects, the step 310 can be optional, and once the device transmit power is limited and/or reduced in the step 308, the method can proceed to the step 312.

Following the step 308 and/or step 310, the step 312 of the method 300 can include determining if the noise is at or below a threshold value and/or if the sector loading is reduced. In aspects, the determiner 218 of the noise reducer 212 of FIG. 2 can perform at least a portion of the step 312. In certain aspects, as discussed above with reference to the noise reducer 212 of FIG. 2, a determination is made as to whether a noise level on a receive side of cell site and/or a base station is at or below a threshold value, such as one of the threshold values discussed above with reference to the noise reducer 212 of FIG. 2. In certain aspects, as also discussed above, the determining of the step 312 can include determining whether a noise level is at or below a threshold over a specified period of time or at predetermined time periods or points of time. In the same or alternative aspects, the step 312 can include determining if the sector loading is reduced, e.g., if the number of active devices has changed from one time point or time period to a subsequent time point or time period.

In the step 312 of the method 300, when it is determined that the noise level is at or not below the threshold level (or is above threshold value) and/or that sector loading has not been reduced, the method 300 can return to the step 302, the step 304, or stay at the step 312 and continue to monitor the noise level. If at the step 312, it is determined that the noise level is below a threshold and/or that the sector loading has been reduced, the method 300 can proceed to the step 314.

In the step 314 of the method 300, the requirement that the device transmit power be reduced or limited can be withdrawn and the devices can transmit power at device and/or carrier default settings, which can include maximum transmit power levels for the device. In such aspects, the adjuster 222 of the noise reducer 212 of FIG. 2 can perform the step 314. In aspects, once the requirement that the device transmit power be reduced or limited is withdrawn, the method 300 can return to either the step 302 or the step 304 for continued monitoring of the noise level at the base station.

Figure 4:
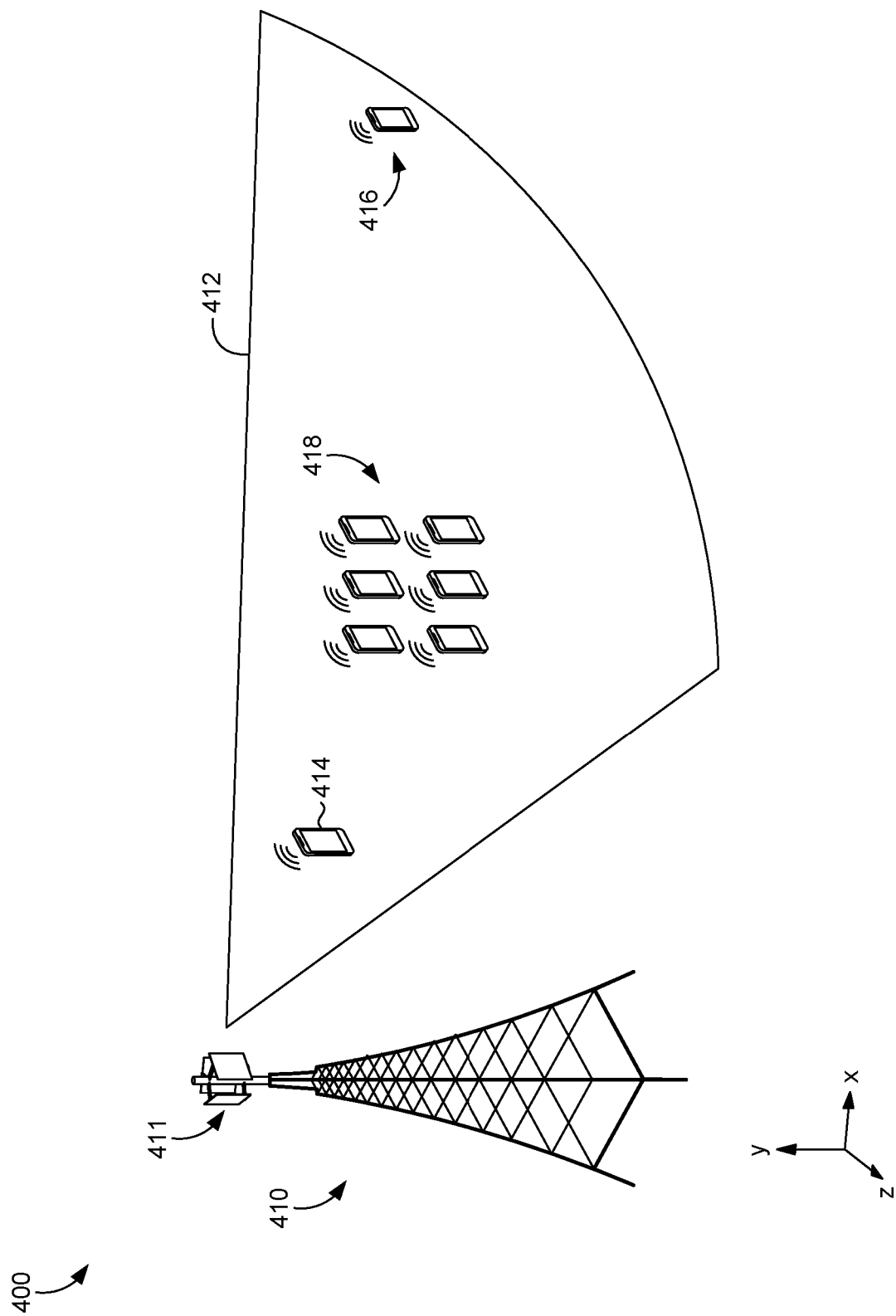
FIG. 4 depicts a system that includes a base station and a plurality of user devices in varying locations within a broadcast footprint of an antenna array, in accordance with aspects herein.

FIG. 4 depicts a system 400, e.g., a telecommunications system, which includes a base station 410 for providing wireless communication services to a plurality of user devices, e.g., UEs. In the aspect depicted in FIG. 4, the base station 410 can include an antenna array 411 that includes one or more antenna elements. In the same or alternative aspects, while not specifically depicted or highlighted in FIG. 4, the base station 410 can include and/or be communicatively coupled to one or more processors that execute all or part of the actions for dynamically limiting device transmit power as described in this disclosure. As can be seen in FIG. 4, a broadcast footprint 412 is present to schematically depict a broadcast footprint where the base station 410 provides wireless communication services.

In various aspects, as discussed above, the systems and methods described herein can limit device transmit power on communications from user devices to a base station, when the noise level at the base station is at or above a threshold value. For instance, in aspects, as discussed above, one or more devices can be required to limit transmit power to a specific level based on carrier aggregation information associated with the one or more devices and/or based on location information of the one or more devices.

In one example scenario, high loading at a base station, e.g., the base station 410, may occur when there is a large number of user devices actively communicating with the base station, such as that schematically depicted by the plurality of user devices 418. For instance, in such aspects, the plurality of user devices 418 can represent a large number of user devices present at a sporting or entertainment venue where the large number of user devices may be transmitting and receiving communications with the base station 410. In aspects, as discussed above, when the noise level at the base station 410 is at or above a threshold value, the systems and methods herein can require device transmit power limits for the devices based on carrier aggregation capabilities of a device and/or on past or current carrier aggregation usage. In this example scenario, the plurality of user devices 418 may include user devices having differing carrier aggregation capabilities and/or may include user devices aggregating differing numbers of carrier components. In such an aspect, the systems and methods disclosed herein may require different device transmit power limits to different user devices of the plurality of user devices 418 based on the carrier aggregation capabilities of a specific device and/or on past or current carrier aggregation usage. For instance, a first device of the plurality of devices 418 may be provided a higher device transmit power level limit compared to a second device of the plurality of devices 418, since the first device aggregates and/or intends to aggregate more carrier components than the second device, e.g., to allow the first device the power needed to effectively transmit the larger data communication.

In a second example scenario based on FIG. 4, when a noise level is at or above a threshold value, the systems and methods disclosed herein may limit the device transmit power of the user devices 414 and 416, which are located at various positions within the broadcast footprint 412. In certain aspects, as discussed above, the systems and methods disclosed herein may limit device transmission power to varying degrees or amounts for different devices based on the location of the devices. In one aspect, varying the device transmission power levels based on location can be performed in scenarios where the devices exhibit the same carrier aggregation capabilities. In an alternative aspect, the device transmission power levels can be limited to varying degrees or amounts based on a location of the device in addition to carrier aggregation capabilities of the devices.

In this second example scenario, the user devices 414 and 416 may be provided differing device transmit power level limits at least partly based on their location and/or distance from the base station 410. In the aspect depicted in FIG. 4, the user device 414 is closer to the base station 410 than the user device 416, and as such, the systems and methods disclosed herein may limit the device transmit power on the user device 414 to a power level that is lower than the device transmit power level limit of the user device 416, e.g., because the closer user device 414 will require less power to transmit communications to the base station 410 compared to the user device 416. In certain aspects, the user device 414 could be considered to be located cell-near and/or the user device 416 can be considered to be located at a cell-edge.

In aspects, the user device 414 can be considered cell-near using any convenient parameters. For instance, in an aspect, a cell-near user device can be defined by being within a predefined area adjacent or near the base station 410, such as using latitudinal and longitudinal coordinates. Additionally or alternatively, cell-near user devices can be identified based on device received power, e.g., a device that is considered cell-near can exhibit a network signal strength of about −90 dBm or greater, about −80 dBm or greater, about −70 dBm or greater, or about −60 dBm or greater. In another aspect, cell-near user devices can be identified based on a round-trip delay time, i.e., the length of time it takes for a signal to be sent to the UE from the broadcast cell plus the length of time it takes for an acknowledgment of that signal to be received at the broadcast cell. In some aspects, the round-trip delay time for cell-near user devices may be at or between 40-50 milliseconds (ms).

In aspects, the user device 416 can be considered to be located at a cell-edge using any convenient parameters. For example, in one aspect, a cell-edge user device can be defined by being within a pre-defined area, e.g., an area in a broadcast footprint 412 that is farthest away from the base station 410, such as using latitudinal and longitudinal coordinates. Additionally or alternatively, cell-edge user devices can be identified based on device received power, e.g., a device that is considered cell-near can exhibit a network signal strength of about −90 dBm or less, or about −80 dBm or less. In another aspect, cell-edge user devices can be identified based on a round-trip delay time, i.e., the length of time it takes for a signal to be sent to the UE from the broadcast cell plus the length of time it takes for an acknowledgment of that signal to be received at the broadcast cell. In some aspects, the round-trip delay time for cell-edge user devices may be greater than 50 milliseconds (ms), or greater than 60 ms.

Figure 5:
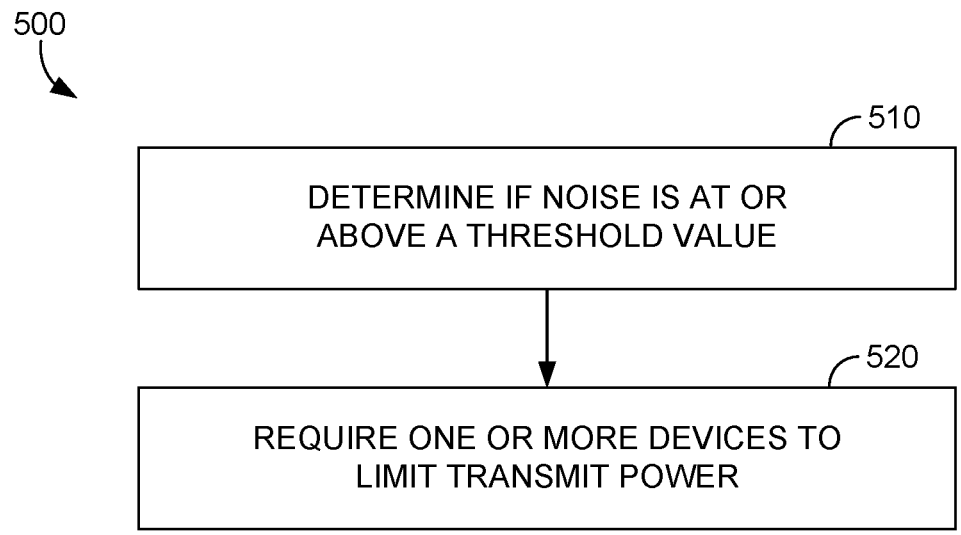
FIG. 5 depicts a flow diagram of another method for limiting device transmit power, in accordance with aspects herein.

FIG. 5 is a flow chart of a method 500 for limiting transmit power for one or more devices associated with a wireless telecommunications network. The step 510 of the method 500, includes determining if noise is at or above a threshold value. In aspects, the step 510 can determine, during a first time period, if the noise level at a base station associated with an antenna array having one or more antenna elements is at or above a threshold value.

In aspects, the step 510 can be performed at least partly by the determiner 218 of the noise reducer 212 of FIG. 2. In aspects, the step 510 can determine if the noise level on a receive side of cell site and/or at a base station is above a threshold value, such as one of the threshold values discussed above with reference to the noise reducer 212 of FIG. 2. As discussed above, in an aspect, the noise level may at least partly be caused by communications transmitted from one or more user devices to the base station. In aspects, the one or more user devices can include high power user devices, low power user devices, or a combination thereof. In the same or alternative aspects, the user devices can be capable of carrier aggregation when communicating with the base station.

The step 520 of the method 500 includes requiring one or more devices to limit transmit power on communications to the base station. In aspects, the step 520 of the method 500 can be performed at least partly by the adjuster 222 of the noise reducer 212 of FIG. 2. In aspects, as discussed above, the device transmit power limits can be varied based on carrier aggregation capabilities of the one or more devices, the location of the one or more devices, or both. In the same or alternative aspects, the device transmit power limits can be based upon a maximum transmit power associated with each device such that the limit is below the maximum transmit power of each device. In another aspect, the device transmit power limit level may be a level that is below the transmit power utilized on prior communications with the base station.

Figure 6:
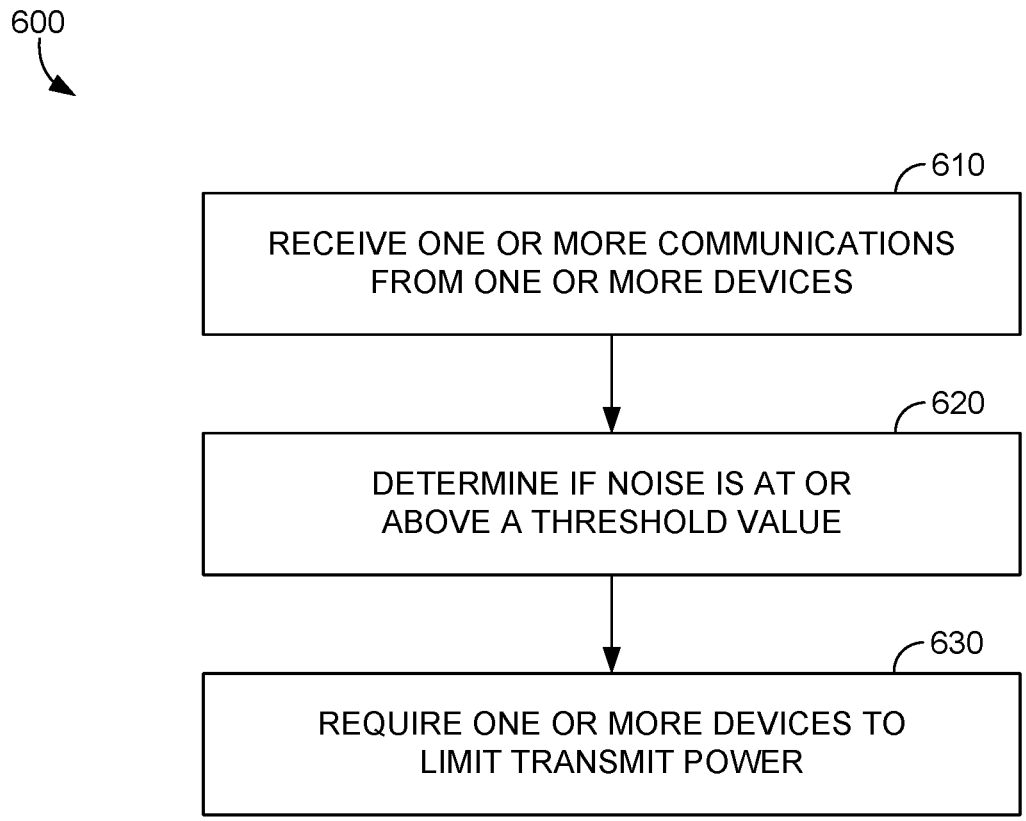
FIG. 6 depicts a flow diagram of yet another method for limiting device transmit power, in accordance with aspects herein.

FIG. 6 is a flow chart of a method 600 for limiting transmit power from one or more devices associated with a wireless telecommunications network. The step 610 of the method 600 can include receiving one or more communications from one or more devices. In aspects, the one or more communications can be sent from one or more devices to a base station associated with the antenna array. In aspects, the step 610 can be performed at least partly by the receiver 216 of the noise reducer 212 of FIG. 2.

The step 620 of the method 600, can include determining if noise is at or above a threshold value. In aspects, the step 620 can determine, during a first time period, if the noise level is at or above a threshold value at a base station associated with an antenna array having one or more antenna elements. In aspects, the step 620 can be performed at least partly by the determiner 218 of the noise reducer 212 of FIG. 2. In aspects, the step 520 can determine if the noise level on a receive side of cell site and/or of the base station is above a threshold value, such as one of the threshold values discussed above with reference to the noise reducer 212 of FIG. 2. In certain aspects, the noise level may at least partly be caused by communications transmitted from one or more user devices to the base station during the receiving of the step 610. In the same or alternative aspects, the user devices can be capable of carrier aggregation when communicating with the base station.

The step 630 of the method 600 includes requiring at least a portion of the one or more devices to limit transmit power on one or more second communications to the base station to a specified level or below. The step 630 can be performed at least partly by the adjuster 222 of the noise reducer 212 of FIG. 2. In certain aspects, the device transmit power level limits can be based on: a number of component carriers the one or more devices utilized in the respective one or more first communications; carrier aggregation capabilities of the one or more devices; maximum transmit power levels of the one or more devices, location information of the one or more devices; or a combination thereof.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically limiting transmit power for one or more devices associated with a wireless telecommunications network, the system comprising:
an antenna array comprising one or more antenna elements; and
one or more processors configured to execute operations comprising:
receiving, at a base station associated with the antenna array, one or more first communications from one or more devices;
determining, during a first time period, if a noise level at the base station is at or above a threshold value;
based at least partly on the determining, requiring at least a portion of the one or more devices to limit transmit power on one or more second communications to the base station to a specified level or below;
subsequent to the requiring, determining, during a second time period, if a total number of the one or more devices communicating with the base station is reduced compared to the first time period; and
based at least partly on the determining, during the second time period, withdrawing the requirement to limit transmit power for the at least a portion of the one or more devices.

2. The system according to claim 1, wherein the specified level for the limit on transmit power for the at least a portion of the one or more devices is based on a carrier aggregation capability of each of the at least a portion of the one or more devices.

3. The system according to claim 1, wherein the one or more processors are configured to execute operations further comprising:

subsequent to the requiring, determining, during a second time period, if the noise level at the base station is at or below the threshold value; and
based at least partly on the determining, during the second time period, withdrawing the requirement to limit transmit power for the at least a portion of the one or more devices.

4. The system according to claim 1, wherein the threshold value is in a range of −70 to −100 decibels with reference to one milliwatt (dBm).

5. The system according to claim 4, wherein the threshold value is in a range of −80 to −90 decibels with reference to one milliwatt (dBm).

6. The system according to claim 1, wherein the specified level for the limit on transmit power for the one or more second communications to the base station is at least 2 decibels with reference to one milliwatt (dBm) less than the transmit power for the one or more first communications.

7. The system according to claim 1, wherein the specified level for the limit on transmit power for the one or more second communications to the base station is based on a number of component carriers each of the at least a portion of the one or more devices utilized in the respective one or more first communications or intends to utilize in the respective one or more second communications.

8. The system according to claim 1, wherein the one or more processors are configured to execute operations further comprising:
prior to the requiring, identifying a location of a first device of the one or more devices and a location of a second device of the one or more devices,
wherein the specified level for the limit on transmit power for the one or more second communications to the base station for the first device is less than the specified level for the second device.

9. The system according to claim 8, wherein the first device is located closer to the one or more antenna elements of the antenna array than the second device.

10. The system according to claim 1, wherein the one or more antenna elements of the antenna array utilizes a 5G wireless communication protocol, a 4G/LTE wireless communication protocol, or both.

11. A method for dynamically limiting transmit power for one or more devices associated with a wireless telecommunications network, the method comprising:
determining, during a first time period, if a noise level at a base station associated with an antenna array having one or more antenna elements is at or above a threshold value;
based at least partly on the determining, requiring one or more devices to limit transmit power on communications to the base station to a specified level that is below a maximum transmit power capability of the respective one or more devices;
determining, during a second time period, if a number of devices communicating with the base station is reduced compared to the number of devices communicating with the base station during the first time period; and
based at least partly on the determining, during the second time period, withdrawing the requirement to limit transmit power for the one or more devices.

12. The method according to claim 11, wherein the threshold value is in a range of −70 to −100 decibels with reference to one milliwatt (dBm).

13. The method according to claim 11, further comprising:

determining, during a second time period, if the noise level at the base station is at or below the threshold value; and based at least partly on the determining, during the second time period, withdrawing the requirement to limit transmit power for the one or more devices.

14. The method according to claim 11, wherein the specified level for the limit on transmit power for the one or more devices is based on: a carrier aggregation capability of each of the one or more devices; a number of component carriers each of the one or more devices utilized in respective prior communications to the base station; or both.

15. The method according to claim 11, further comprising:

prior to the requiring, identifying a location of a first device of the one or more devices and a location of a second device of the one or more devices, wherein the specified level for the limit on transmit power for the communications to the base station for the first device is less than the specified level for the second device.

16. A method for dynamically limiting transmit power for one or more devices associated with a wireless telecommunications network, the method comprising:

receiving, at a base station associated with an antenna array comprising one or more antenna elements, one or more first communications from one or more devices;

determining, during a first time period, if a noise level at the base station is at or above a threshold value; and based at least partly on the determining, requiring at least a portion of the one or more devices to limit transmit power on one or more second communications to the base station to a specified level or below, wherein the specified level for the limit on transmit power for the one or more second communications to the base station is based on a number of component carriers each of the at least a portion of the one or more devices utilized in the respective one or more first communications or intends to utilize in the respective one or more second communications.

17. The method according to claim 16, wherein the specified level for the limit on transmit power for the at least a portion of the one or more devices is based on a carrier aggregation capability of each of the at least a portion of the one or more devices.

18. The method according to claim 16, further comprising:

determining, during a second time period, whether: the noise level at the base station is at or below the threshold value; a total number of the one or more devices communicating with the base station is reduced compared to the first time period, or both; and based at least partly on the determining, during the second time period, withdrawing the requirement to limit transmit power for the at least a portion of the one or more devices.

* * * * *